US012777491B2

(12) United States Patent
Yue et al.

(10) Patent No.: US 12,777,491 B2
(45) Date of Patent: Oct. 27, 2026

(54) METHOD AND APPARATUS FOR DATA TRANSMISSION

(71) Applicant: LENOVO (BEIJING) LIMITED, Beijing (CN)

(72) Inventors: Ran Yue, Beijing (CN); Lianhai Wu, Beijing (CN); Jie Shi, Beijing (CN); Min Xu, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 873 days.

(21) Appl. No.: 18/040,825

(22) PCT Filed: Aug. 7, 2020

(86) PCT No.: PCT/CN2020/107739

§ 371 (c)(1),
(2) Date: Feb. 7, 2023

(87) PCT Pub. No.: WO2022/027565

PCT Pub. Date: Feb. 10, 2022

(65) Prior Publication Data

US 2023/0292327 A1 Sep. 14, 2023

(51) Int. Cl.
*H04W 72/23* (2023.01)
*H04W 72/0446* (2023.01)
*H04W 76/27* (2018.01)

(52) U.S. Cl.
CPC ....... *H04W 72/23* (2023.01); *H04W 72/0446* (2013.01); *H04W 76/27* (2018.02)

(58) Field of Classification Search
CPC .. H04W 72/23; H04W 72/0446; H04W 76/27
See application file for complete search history.

(56) References Cited

U.S. PATENT DOCUMENTS

2020/0170069 A1 5/2020 Guo et al.
2022/0232594 A1 * 7/2022 Park ........................ H04L 5/001

FOREIGN PATENT DOCUMENTS

CN 110602794 A 12/2019
CN 110856276 2/2020

(Continued)

OTHER PUBLICATIONS

U.S. Appl. No. 63/060,548, filed Aug. 3, 2020, corresponding to US 2022/0232594 A1. (Year: 2020).*

(Continued)

*Primary Examiner* — Melvin C Marcelo
(74) *Attorney, Agent, or Firm* — Isidore PLLC

(57) ABSTRACT

Embodiments of the present application are directed to a method and apparatus for data transmission. In an embodiment of the present application, the method includes: receiving configuration information for data transmission, wherein the configuration information for data transmission indicates at least one of the following: first configuration information indicating pre-configured bundling resource(s) for one transport block (TB) or pre-configured at least one slot for at least one TB; and second configuration information indicating at least one resource for data transmission during at least one random access channel (RACH) procedure; and performing the data transmission based on the configuration information when a user equipment (UE) is in radio resource control (RRC)_IDLE state or RRC_INACTIVE state.

18 Claims, 4 Drawing Sheets

(56) References Cited

FOREIGN PATENT DOCUMENTS

| | | | | |
|---|---|---|---|---|
| CN | 111225443 | | 6/2020 | |
| CN | 111447644 | A | 7/2020 | |
| EP | 4185055 | B1 * | 3/2025 | ............ H04W 76/27 |
| JP | 2020096352 | A | 6/2020 | |

OTHER PUBLICATIONS

Qualcomm incorporated, R2-1916228, "Email discussion report [107bis#90] Further details on "m" operation for PUR", 3GPP TSG-RAN WG2 Meeting #108; Nov. 9, 2019; 16 pages.
Office Action dated Jun. 17, 2024, for PRC (China) Pat. Appln. No. 202080103112.3.
Office Action dated Jan. 8, 2025, for PRC (China) Pat. Appln. No. 202080103112.3.
Notice of Allowance issued by JPO for Japanese Patent Application No. 2023-508485, dated Nov. 18, 2024.
Office Action issued by JPO for Japanese Patent Application No. 2023-508485, dated Jul. 16, 2024.
Sony, "Discussion on different aspects of UL Small data transmissions in NR", 3GPP TSG-RAN WG2 Meeting #111 electronic, Online, Aug. 17-Aug. 28, 2020, R2-2007180, 5 pages.
Ericsson, "2-step and 4-step based RACH Small Data transmission", 3GPP TSG-RAN WG2 #111-e, Online, Aug. 17-28, 2020, Tdoc R2-2007197, 5 pages.
European Search Report, EP patent application No. 20948823.8, Mar. 7, 2024.
Nokia et al., "Analysis of D-Pur Configuration Signaling" 3GPP Draft; R2-1909029-D-PUR-V3, 3rd Generation Partnership Project (3GPP), Mobile Competence Centre, Aug. 15, 2019.
Document Rapporteur (Blackberry): "Ran2 agreements for Rel-16 additional enhancements for NB-Iot and MTC" 3GPP Draft, R2-2005948, 3rd Generation Partnership Project (3GPP), Mobile Competence Centre, Jun. 19, 2020.
ZTE Corporation et al. "Mac-RRC coordination for TA validation and some FFS for D-Pur" 3GPP Draft; R2-2001200, 3rd Generation Partnership Project (3GPP), Mobile Competence Centre, Feb. 14, 2020.
Intel Corporation "Discussion on procedure for 2-step Rach", 3GPP TSG RAN WG1 #98bis, Chongquing, China, Oct. 14-20, 2019.
Patent Cooperation Treaty (PCT) International Application No. PCT/CN/2020/107739, International Search Report and Written Opinion, May 6, 2021.
3GPP Draft; R2-2005948, Jun. 19, 2020, 3rd Generation Partnership Project (3GPP), Mobile Competence Centre, 650, route des Lucioles, F-06921 Sophia-Antipolis Cedex, France.

* cited by examiner

METHOD AND APPARATUS FOR DATA TRANSMISSION

TECHNICAL FIELD

Embodiments of the present application generally relate to wireless communication technology, especially to a method and apparatus for data transmission.

BACKGROUND

Dedicated pre-configured uplink resource (D-PUR) solutions for data transmission in IDLE state have been discussed in long term evolution (LTE) and have been applied to internet of things (IoT). Both the traffic and rules are relatively simple comparing with the smartphone applications in new radio (NR) systems. For a user equipment (UE) in radio resource control (RRC) INACTIVE state, pre-configured physical uplink shared channel (PUSCH) resources (configured grant type 1 resources) will be applied for transmitting uplink small data. This configured grant type 1 is configured for a dedicated UE. However, NR specific cases have not been discussed when considering data transmission in RRC_INACTIVE state.

SUMMARY OF THE APPLICATION

Embodiments of the present application provide a method and apparatus for data transmission, e.g., in RRC_IDLE state or RRC_INACTIVATE state.

An embodiment of the present application provides a method. The method may include: receiving configuration information for data transmission, wherein the configuration information for data transmission indicates at least one of the following: first configuration information indicating pre-configured bundling resource(s) for one transport block (TB) or pre-configured at least one slot for at least one TB; and second configuration information indicating at least one resource for data transmission during at least one random access channel (RACH) procedure; and performing the data transmission based on the configuration information when a UE is in RRC_IDLE state or RRC_INACTIVE state.

In an embodiment of the present application, in the case of performing the data transmission based on the first configuration information, the method may further include: configuring one counter "m" for the pre-configured bundling resource(s) for one TB or the pre-configured at least one slot for at least one TB; and keeping a value of the counter "m" unchanged when only part of one configured resource occasion for the pre-configured bundling resource(s) is used for data transmission, wherein the counter "m" is used to implicitly release the pre-configured bundling resource(s).

In an embodiment of the present application, in the case of performing the data transmission based on the first configuration information, the method may further include: configuring a plurality of counters "m" with each counter "m" for the pre-configured bundling resource(s) for each TB of the at least one TB, wherein the counter "m" is used to implicitly release the pre-configured bundling resource(s). In an example, the method may further include: increasing a value of the counter "m" when the pre-configured bundling resource(s) for each TB is not used while the UE is in RRC_INACTIVE state or RRC_IDLE state. In another example, the method may further include: increasing a value of the counter "m" when the pre-configured bundling resource(s) for each TB is used in RRC_INACTIVE or RRC_IDLE but no response is received.

In an embodiment of the present application, in the case of performing the data transmission based on the first configuration information, the method may further include: configuring one counter "m" for the pre-configured bundling resource(s) for one TB or the pre-configured at least one slot for at least one TB; and increasing a value of the counter "m" when only part of one configured resource occasion for the pre-configured bundling resource(s) is used for data transmission, wherein the counter "m" is used to implicitly release the pre-configured bundling resource(s).

In an embodiment of the present application, in the case of performing the data transmission based on the first configuration information, the method may further include: configuring one timer for the pre-configured bundling resource(s) for one TB or the pre-configured at least one slot for at least one TB; and starting the timer at or later than a slot that contains the first of a corresponding PUSCH transmission for the data transmission, wherein the timer is used to monitor feedback for the data transmission.

In an embodiment of the present application, the method may further include: restarting the timer at or later than a first slot or a last slot of a PUSCH transmission corresponding to a retransmission indicated by uplink grants, when PDCCH transmission is for the UE with the data transmission and contains the uplink grants for a retransmission.

In an embodiment of the present application, in the case of performing the data transmission based on the first configuration information, the method may further include: configuring a plurality of timers for the pre-configured bundling resource(s) for the pre-configured at least one slot for at least one TB, wherein the pre-configured at least one slot is non-consecutive slots, and the pre-configured bundling resource(s) are non-consecutive resources; and starting each timer of the plurality of timers at or after a slot that contains a PUSCH transmission of the data transmission, wherein the timer is used to monitor feedback for the data transmission. In an example, each timer corresponds to a part of the non-consecutive resources within one cycle. In another example, each timer corresponds to each TB of the at least one TB within one cycle.

In an embodiment of the present application, the method may further include: extending a monitor window of the timer when the monitor window cannot receive all PDCCH; and receiving a missed part of the PDCCH in the extended monitor window.

In an embodiment of the present application, performing the data transmission based on the second configuration information may further include: performing the data transmission by using PUSCH of Msg.A of 2-step RACH procedure which is not configured for the data transmission, when reference signal receiving power (RSRP) of the UE is small than a first threshold. Performing the data transmission by using PUSCH of Msg.A of 2-step RACH procedure which is not configured for the data transmission when: data amount in a buffer is small than a second threshold; and/or modulation and coding scheme (MCS) of the PUSCH of Msg.A is smaller than a third threshold.

In an embodiment of the present application, performing the data transmission based on the second configuration information may further include: performing the data transmission by using PUSCH of Msg.A of 2-step RACH procedure which is configured for another traffic of data transmission, if reference signal receiving power (RSRP) of the UE is larger than a first threshold. Performing the data transmission by using PUSCH of Msg.A of 2-step RACH procedure which is configured for another traffic of data transmission, when: data amount in a buffer is small than a second threshold; and/or MCS of the PUSCH of Msg.A is smaller than a third threshold.

In an embodiment of the present application, performing the data transmission by using PUSCH of Msg.A of 2-step RACH procedure which is not configured for the data transmission when: data amount in a buffer is small than a second threshold; and/or MCS of the PUSCH of Msg.A is small than all of MCSs of PUSCHs of Msg.A of 2-step RACH procedure which are configured for the data transmission.

In an embodiment of the present application, one or more PUSCHs of Msg.A for different traffic which is configured for the data transmission are broadcast or RRC dedicated configured.

In an embodiment of the present application, the data transmission is performed based on the second configuration information, when the pre-configured bundling resource(s) regarding data transmission is not suitable for the data transmission. The data transmission is performed by 2-step RACH procedure prior to 4-step RACH procedure.

Another embodiment of the present application provides a method. The method may include: transmitting configuration information for data transmission, wherein the configuration information for data transmission indicates at least one of the following: first configuration information indicating pre-configured bundling resource(s) for one TB or pre-configured at least one slot for at least one TB; and second configuration information indicating at least one resource for data transmission during at least one RACH procedure; and receiving the data transmission based on the configuration information when a user equipment UE is in RRC_IDLE state or RRC_INACTIVE state.

In an embodiment of the present application, when receiving the data transmission based on the first configuration information, the method may further include: configuring one counter "m" for the pre-configured bundling resource(s) for one TB or the pre-configured at least one slot for at least one TB; and keeping a value of the counter "m" unchanged when data is received on only part of one configured resource occasion for the pre-configured bundling resource (s), wherein the counter "m" is used to implicitly release the pre-configured bundling resource(s).

In an embodiment of the present application, when receiving the data transmission based on the first configuration information, the method may further include: configuring a plurality of counters "m" with each counter "m" for the pre-configured bundling resource(s) for each TB of the at least one TB, wherein the counter "m" is used to implicitly release the pre-configured bundling resource(s). The method may further include: increasing a value of the counter "m" when an response corresponding to the pre-configured bundling resource(s) for each TB including a case of LBT failure is transmitted while the UE is in RRC_INACTIVE state or RRC_IDLE state.

In an embodiment of the present application, when receiving the data transmission based on the first configuration information, the method may further include: configuring one counter "m" for the pre-configured bundling resource(s) for one TB or the pre-configured at least one slot for at least one TB; and increasing a value of the counter "m" when data is received on only part of one configured resource occasion for the pre-configured bundling resource(s), wherein the counter "m" is used to implicitly release the pre-configured bundling resource(s).

In an embodiment of the present application, in the case of receiving the data transmission based on the first configuration information, the method may further include: configuring one timer for the pre-configured bundling resource(s) for one TB or the pre-configured at least one slot for at least one TB, wherein the timer is used for the UE to monitor feedback for the data transmission.

In an embodiment of the present application, in the case of receiving the data transmission based on the first configuration information, the method may further include: configuring a plurality of timers for the pre-configured bundling resource(s) or for the pre-configured at least one slot for at least one TB, wherein the pre-configured at least one slot is non-consecutive slots, and the pre-configured bundling resource(s) are non-consecutive resources, wherein the timer is used for the UE to monitor feedback for the data transmission. In an example, each timer corresponds to a part of the non-consecutive resources within one cycle. In another example, each timer corresponds to each TB of the at least one TB within one cycle.

In an embodiment of the present application, in the case of receiving the data transmission based on the second configuration information the method may further include: transmitting an indication for indicating the UE to perform the data transmission by using PUSCH of Msg.A of 2-step RACH procedure which is not configured for the data transmission, when RSRPof the UE is small than a first threshold. Transmitting the indication for indicating the UE to perform the data transmission by using PUSCH of Msg.A of 2-step RACH procedure which is not configured for the data transmission when: data amount in a buffer is small than a second threshold; and/or MCS of the PUSCH of Msg.A is smaller than a third threshold.

In an embodiment of the present application, in the case of receiving the data transmission based on the second information, the method may further include: transmitting an indication for indicating the UE to perform the data transmission by using PUSCH of Msg.A of 2-step RACH procedure which is configured for another traffic of data transmission, when RSRP of the UE is larger than a first threshold.

In an embodiment of the present application, transmitting an indication for indicating the UE to perform the data transmission by using PUSCH of Msg.A of 2-step RACH procedure which is configured for another traffic of data transmission, when: data amount in a buffer is small than a second threshold; and/or MCS of the PUSCH of Msg.A is smaller than a third threshold.

In an embodiment of the present application, transmitting an indication for indicating the UE to perform the data transmission by using PUSCH of Msg.A of 2-step RACH procedure which is not configured for the data transmission when: data amount in a buffer is small than a second threshold; and/or MCS of the PUSCH of Msg.A is small than all of MCSs of PUSCHs of Msg.A of 2-step RACH procedure which are configured for the data transmission. One or more PUSCHs of Msg.A for different traffic which is configured for the data transmission are broadcast or RRC dedicated configured.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

Embodiments of the present application complement some new rules in order to facilitate the implementation of NR small data transmission.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
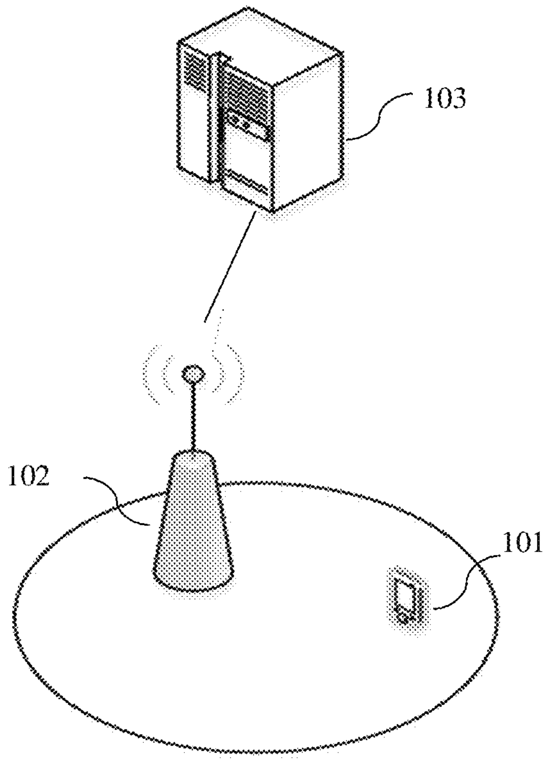
FIG. 1 illustrates a wireless communication system according to some embodiments of the present application.

FIG. 1 illustrates a wireless communication system according to some embodiments of the present application.

As shown in FIG. 1, the wireless communication system can include at least one base station (BS), at least one UE, and a core network (CN) node. Although a specific number of BSs and UEs, e.g., a BS (e.g., BS 102) and a UE (UE 101) are depicted in FIG. 1, one skilled in the art will recognize that any number of the BSs and UEs may be included in the wireless communication system. As shown in FIG. 1, the BS 102 may be distributed over a geographic region and may communicate with the CN node 103 via an interface.

The UE 101 may be a computing device, such as a desktop computer, a laptop computer, a personal digital assistant (PDA), a tablet computer, a smart television (e.g., a television connected to the Internet), a set-top box, a game console, a security system (including security cameras), a vehicle on-board computer, a network device (e.g., router, switch, and modem), or the like. According to an embodiment of the present application, the UE 101 may be a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE 201 may be a wearable device, such as a smart watch, a fitness band, an optical head-mounted display, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art.

The BS 102 may communicate with a CN node 103 via an interface. In some embodiments of the present application, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally part of a radio access network that may include one or more controllers communicably coupled to one or more corresponding BS(s).

In an example, the CN node 103 can be a mobility management entity (MME) or a serving gateway (S-GW). In another embodiment of the present application, the CN node 103 may include a mobility management function (AMF) or a user plane function (UPF).

The wireless communication system may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, a LTE network, a 3rd generation partnership project (3GPP)-based network, a 3GPP 5G network, a satellite communications network, a high altitude platform network, and/or other communications networks.

In some embodiments of the present application, the wireless communication system is compatible with the 5G new radio of the 3GPP protocol, wherein BS 102 transmits data using an OFDM modulation scheme on the DL and UE 101 transmit data on the UL using a single-carrier frequency division multiple access (SC-FDMA) or OFDM scheme. More generally, however, the wireless communication system may implement some other open or proprietary communication protocols, for example, WiMAX, WiFi, among other protocols.

In some embodiments of the present application, the BS 102 may communicate using other communication protocols, such as the IEEE 802.11 family of wireless communication protocols. Further, in some embodiments of the present application, the BS 102 may communicate over licensed spectrums, whereas in other embodiments the BS 102 may communicate over unlicensed spectrums. Embodiments of the present application are not intended to be limited to the implementation of any particular wireless communication system architecture or protocol. In yet some embodiments of the present application, the BS 102 may communicate with UE 101 using the 3GPP 5G protocols.

In an example, the UE 101 is in IDLE mode or in RRC_INACTIVE state. When performing small data transmission, the UE 101 connects to the BS 102, and the BS 102 transmits the small data to the CN node 103 via the interface.

Herein, the data transmission or small data transmission may mean that a UE in inactive mode or idle mode could transmit the data to the network side (or network), or receive the data from the network side. The data transmission may include at least one of an uplink (UL) data transmission and downlink (DL) data transmission. After the completion of the data transmission, the inactive or idle UE may receive a suspend message or release message from the network and then go back to the inactive or idle mode. In some other embodiments of the present application, after the completion of the data transmission, the inactive or idle UE may receive a suspend message or release message from the network and the UE still stay in inactive or idle mode during the data transmission procedure. In some embodiments of the present application, the suspend message or release message is an RRC message. In some embodiments of the present application, the data size in such data transmission may be no larger than the maximum TBsize that can be applied in one transmission, as defined in standard(s) or protocol(s). Small data transmission is one of such scenarios.

In order to better understand the embodiments of the present application, the following background knowledge is now introduced.

In the 3GPP RAN2 #107 meeting, D-PUR agreements on "m" are made as follows:

At least the following information can be included in PUR (re)configurations:
- "m" consecutive missed allocations before release, FFS values.
- Time Alignment Timer for idle mode.
- RSRP change threshold for Serving cell.

In the 3GPP RAN2 #108 meeting, agreements on "m" operation for PUR are made as follows:

UE shall increase 'm' when (1) PUR occasion is not used while UE is in RRC_IDLE and (2) PUR occasion is used in RRC_IDLE but no response (none of explicit HARQ ACK/NACK, L1 ACK or L2/L3 response) is received.

RAN2 notes RAN1 #96 agreement "After data transmission on PUR, if nothing is received by the UE in a time period, the UE shall fallback to legacy RACH/EDT procedure." contradicts with RAN2 #107 agreement. RAN2 reconfirms the RAN2 #107 agreement "Fallback after D-PUR transmission is not successful is not specified i.e. it is up to UE implementation to initiate legacy RA, MO-EDT or wait for next D-PUR occasion".

Network shall increase 'm' when no response corresponding to a PUR occasion (none of explicit HARQ ACK/NACK, L1 ACK or L2/L3 response) is sent by the network.

'm' is not increased (neither by UE nor eNB) while UE is in RRC CONNECTED.

Counter 'm' is reset to zero after successful communication between UE and eNB using PUR.

Counter 'm' is not reset to zero after successful communication between UE (with a valid PUR configuration) and eNB in RRC CONNECTED.

Existing access barring methods referenced from 5.3.3.2 in TS 36.331, except per-RSRP barring, are applicable for PUR.

'm' is increased if PUR is skipped due to access barring (i.e., no special handling).

'm' is increased if PUR is skipped due to UE being in extendedWaitTime (i.e., no special handling).

Configurable value of m={2, 4, 8, spare}.

Furthermore, D-PUR agreements on PDCCH monitoring are made as follows:

After the uplink D-PUR transmission, the UE monitors PDCCH under the control of a timer:
- The timer starts after D-PUR transmission.
- The timer restarts if a scheduling for D-PUR retransmission is received.
- The UE considers that the D-PUR transmission has failed if the timer expires.
- The timer is stopped when D-PUR procedure ends/succeeds.

Furthermore, regarding the above D-PUR solution, 3GPP TS 36.321 describes the following:

After transmission using PUR, the MAC entity shall monitor PDCCH identified by PUR-RNTI in the PUR response window using timer pur-ResponseWindowTimer, which starts at the subframe that contains the end of the corresponding PUSCH transmission plus 4 subframes, and has the length pur-ResponseWindowSize. While pur-ResponseWindowTimer is running, the MAC entity shall:

if the PDCCH transmission is addressed to the PUR-RNTI and contains an UL grant for a retransmission:

restart pur-ResponseWindowTimer at the last subframe of a PUSCH transmission corresponding to the retransmission indicated by the UL grant plus 4 subframes.

Regarding a UE procedure for transmitting PUSCH in NR-unlicensed (NR-U), 3GPP describes that: PUSCH transmission(s) can be dynamically scheduled by an UL grant in downlink control information (DCI), or the transmission can correspond to a configured grant Type 1 or Type 2. The configured grant Type 1 PUSCH transmission is semi-statically configured to operate in response to the reception of a high (or higher) layer parameter of configuredGrantConfig including rrc-ConfiguredUplinkGrant without the detection of an UL grant in a DCI. The configured grant Type 2 PUSCH transmission is semi-persistently scheduled by an UL grant in a valid activation DCI according to Clause 10.2 of [6, TS 38.213] after the reception of the higher layer parameter configuredGrantConfig not including rrc-ConfiguredUplinkGrant. when Configuredgrantconfig-ToAddModList-r16 is configured, more than one configured grant configuration of configured grant Type 1 and/or configured grant Type 2 may be active at the same time on an active BWP of a serving cell. Herein, the expression "A and/or B" means at least one of A and B, i.e., A, or B, or both of A and B.

Furthermore, in the 3GPP RAN2 #108 meeting, an agreements is made: For multi-transmission time interval (TTI) UL grant, a UE is allowed to map generated TB(s) internally to different hybrid automatic repeat request (HARQ) processes in case of listen before transmission (LBT) failure(s), i.e. a UE may transmit a TB pending for transmission in a HARQ process due to a failed LBT in a different HARQ process associated with a PUSCH for which the LBT was successful.

In 3GPP TS 38.321, regarding LBT failure detection and recovery procedure, it describes the following content:

---

...
For each activated Serving Cell configured with lbt-FailureRecoveryConfig, the MAC entity shall:
1>if LBT failure indication has been received from lower layers:
  2>start or restart the lbt-FailureDetectionTimer;
  2>increment LBT_COUNTER by 1;
  2>if LBT_COUNTER >= lbt-FailureInstanceMaxCount:
    3>trigger consistent LBT failure for the active UL BWP in this Serving Cell;
    3>if this Serving Cell is the SpCell:
      4>if consistent LBT failure has been triggered in all UL BWPs configured with PRACH occasions on same carrier in this Serving Cell:
        5>indicate consistent LBT failure to upper layers.
...

---

As mentioned above, the D-PUR solution for data transmission in IDLE state has been discussed in LTE and has been applied to the IoT. However, NR specific cases have not been discussed when considering data transmission in RRC_INACTIVE state. For example, how to handle of a counter "m" with multi-slot grant in NR or NR-U spectrum, how to handle of the timer for monitoring PDCCH when multiple grants allocated, and whether to allow small data transmission choose a legacy PUSCH of Msg.A of 2-step RACH procedure in RACH procedure. These issues will be discussed in the following.

Figure 2:
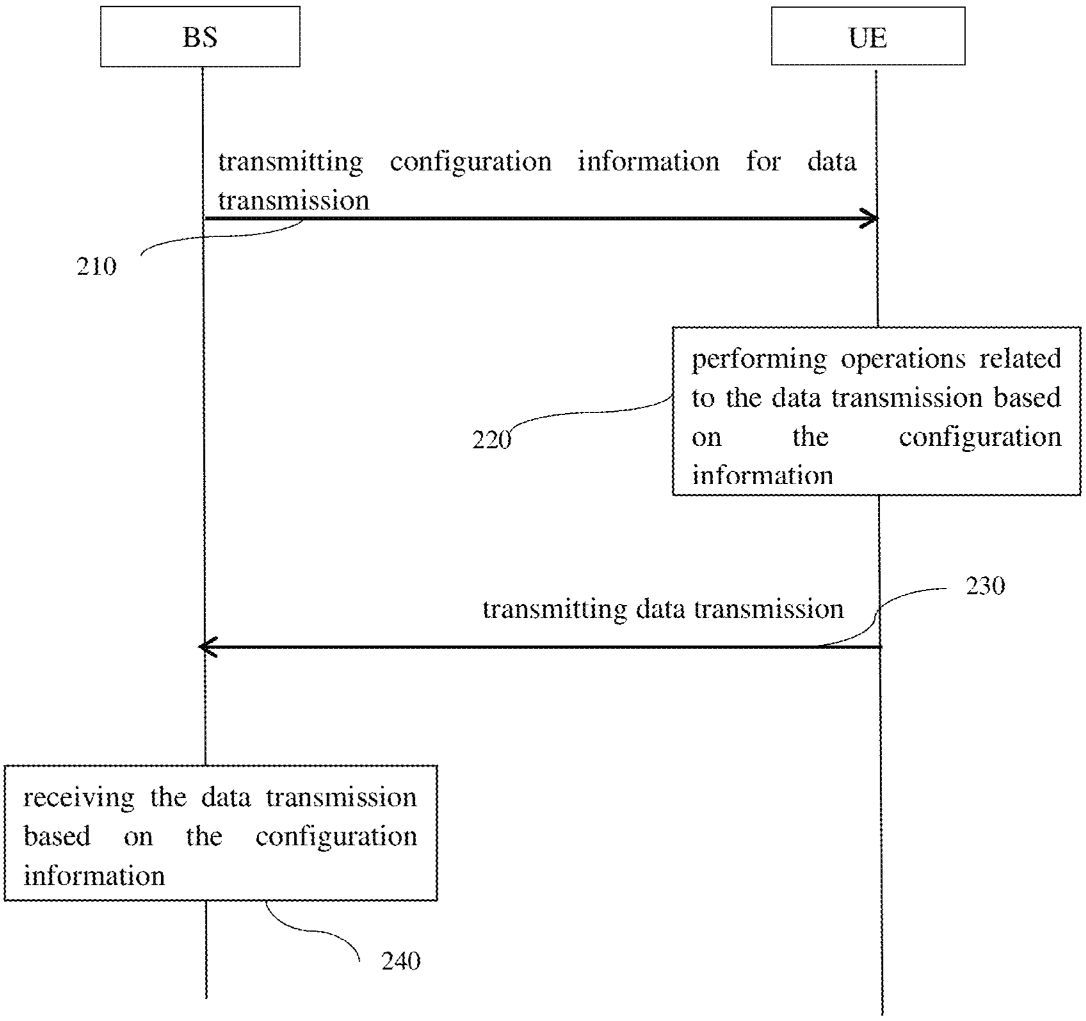
FIG. 2 illustrates a flow chart of a method for data transmissions on multiple resources according to some embodiments of the present application.

FIG. 2 illustrates a flow chart of a method for data transmissions on multiple resources according to some embodiments of the present application. The method in FIG. 2 is performed between a BS (e.g., BS 102 in FIG. 1) and a UE (e.g., UE 101 in FIG. 1). In the description of the present application, the data transmission may also indicate the small data transmission, and the UE is in RRC_IDLE state or RRC_INACTIVE state.

As shown in FIG. 2, in step 210, the BS transmits configuration information for data transmission. For example, the configuration information for data transmission indicates at least one of the following: (1) first configuration information indicating pre-configured bundling resource(s) for one TB or pre-configured at least one slot for at least one TB; and (2) second configuration information indicating at least one resource for data transmission during at least one RACH procedure. For example, for the second configuration information, the at least one resource for the data transmission during the RACH procedure may be a PUSCH resource, which can be configured for one TB or for pre-configured at least one slot for at least one TB.

After receiving the configuration information for data transmission from the BS, in step 220, the UE may perform related operations of the data transmission based on the configuration information, which will be described in conjunction with the following embodiments of the present application in detail. Then in step 230, the UE may transmit the data transmission. Step 220 and 230 can jointly be deemed as performing the data transmission based on the configuration information in the UE.

In step 240, the BS may receive the data transmission based on the configuration information and perform operations related to the data transmission, which will be described in conjunction with the following embodiments of the present application in detail.

The following will describe the method as shown in FIG. 2 in conjunction with various embodiments of the present application in detail with respect to the above described issues. In the following description, the solutions performed by the UE or the BS based on the first configuration information indicating pre-configured bundling resource(s) may be also called a pre-configured resources solution, and the solution performed by the UE or the BS based on the second configuration information indicating at least one resource for data transmission during at least one RACH procedure may be also called a RACH based solution.

Pre-Configured Resources Solution

In NR and NR-U, the pre-configured resource(s) could be bundling for one TB or multiple-slot for multiple TBs. Regarding the issue on how to handle of a counter ‘m’ (which is used to implicitly release the pre-configured bundling resource(s)) with multi-slot grant in NR or NR-U (the multi-slot may be multi-transmission TTI or multiple other time unit in an example), the inventor of the present application considers that: the counter “m” is used to monitor whether there is data transmission and avoid the waste of pre-configured uplink resources by releasing the pre-configured uplink resources when the value of the counter “m” is consecutively increased to a configured maximum value.

In an embodiment of the present application, one single counter “m” per pre-configured uplink resource is introduced.

In particular, one counter “m” is configured per pre-configured uplink resource for small data transmission in RRC_INACTIVE or RRC_IDLE state. The counter “m” is used to implicitly release the pre-configured bundling resource(s). In an example, the counter “m” is configured for the pre-configured bundling resource(s) for one TB. In another example, the counter “m” is configured for the pre-configured bundling resource(s) for the pre-configured at least one slot for at least one TB.

In this embodiment, the UE will not increase the value of the counter “m” when only part of one configured resource occasion for the pre-configured bundling resource(s) is used for data transmission. That is, the UE will keep the value of the counter “m” unchanged when only part of one configured resource occasion for the pre-configured bundling resource(s) is used for data transmission. The part of the configured resource occasion for the pre-configured bundling resource(s) may be part of the resource in time domain or part of the resource in frequency domain. One configured resource occasion refers to one transmission occasion of one TB in the continuously configured resources, or one occasion of one cycle (including multiple TB transmission) of a configured grant.

Correspondingly, the network, e.g., the BS will not increase the value of the counter “m” when data is received on only part of one configured resource occasion for the pre-configured bundling resource(s) is used for data transmission. That is, the BS will keep the value of the counter “m” unchanged too.

In another embodiment of the present application, multiple counters “m” per TB transmission occasion are introduced. That is, multiple counters “m” are configured with a counter “m” for a TB transmission occasion. In some other embodiments of the present application, multiple counters “m” are configured with a counter “m” for a logical channel, or multiple counters “m” are configured with a counter “m” for a data radio bearer (DRB). The counter “m” is used to implicitly release the pre-configured bundling resource(s).

In particular, multiple counters “m” is configured per TB transmission occasion which can be transmitted on the pre-configured bundling uplink resource(s) as small data transmission in RRC_INACTIVE or RRC_IDLE state.

In this embodiment, in an example, the UE will increase the value of the counter “m” when the pre-configured bundling resource(s) (such as, the pre-configured uplink resource occasion) corresponding to the TB is not used while the UE is in RRC_INACTIVE or RRC_IDLE. In another example, the UE will increase the value of the counter “m” when the pre-configured bundling resource(s) (the pre-configured uplink resource occasion) corresponding to the TB is used in RRC_INACTIVE or RRC_IDLE but no response (that is, none of explicit HARQ ACK/NACK, L1 ACK or L2/L3 response) is received.

Correspondingly, the network, e.g., the BS will increase the value of the counter “m” when no response corresponding to the pre-configured bundling resource(s) (such as, a pre-configured uplink resource occasion) corresponding to the TB (that is, none of explicit HARQ ACK/NACK, L1 ACK or L2/L3 response) including the case of LBT failure, is sent by the network.

Further, a RRC reconfiguration can be triggered when the value of the counter “m” arrives to the threshold or maximum (which is configured by the network).

In yet another embodiment of the present application, one single counter “m” per pre-configured uplink resource is introduced.

In particular, one counter "m" is configured per pre-configured uplink resource for small data transmission in RRC_INACTIVE or RRC_IDLE state. The counter "m" is used to implicitly release the pre-configured bundling resource(s). In an example, the counter "m" is configured for the pre-configured bundling resource(s) for one TB. In another example, the counter "m" is configured for the pre-configured bundling resource(s) for the pre-configured at least one slot for at least one TB.

In this embodiment, the UE will increase the value of the counter "m" when only part of one configured resource occasion for the pre-configured bundling resource(s) is used for data transmission. The part of the configured resource occasion for the pre-configured bundling resource(s) may be part of the resource in time domain or part of the resource in frequency domain. One configured resource occasion refers to one transmission occasion of one TB in the continuously configured resources, or one occasion of one cycle (including multiple TB transmission) of a configured grant.

Correspondingly, the network, e.g., the BS will increase the value of the counter "m" when data is received on only part of one configured resource occasion for the pre-configured bundling resource(s) is used for data transmission.

Regarding the issue on how to handle the timer for monitoring PDCCH when multiple grants allocated, the inventor of the present application considers that: according to 3GPP TS 36.321, a timer for monitoring PDCCH (or called a PDCCH monitor timer) is started at the subframe that contains the end of the corresponding PUSCH transmission plus 4 subframes. While when multiple slots (or TTIs) or bundling resources are granted, the related condition for timer starting should be specified because the current rule is not applicable.

In an embodiment, one timer is configured for the pre-configured bundling resource(s) for one TB or the pre-configured at least one slot for at least one TB, and the timer is used to monitor the feedback for the data transmission from the receiver (the network). In an example, the timer monitors PDCCH from the network. In an example, the timer may be configured by the network for the UE. The UE starts the timer at or later than a slot that contains the first of a corresponding PUSCH transmission for the data transmission. Or the UE starts the timer once/after the first of a corresponding PUSCH transmission for the data transmission is transmitted. For example, the UE is configured with slot 0, slot 1, slot 2, slot 3 for the small data transmission. Slot 0 can be considered as the first slot of PUSCH transmission, then "the UE starts the timer at a slot that contains the first of a corresponding PUSCH transmission for the data transmission" means the UE starts the timer at slot 0; "the UE starts the timer once/after the first of a corresponding PUSCH transmission for the data transmission is transmitted" means the UE starts the timer at slot 1 (that is, slot 0 plus one slot).

Furthermore, the UE restarts the timer at or later than a first slot or a last slot of a PUSCH transmission corresponding to a retransmission indicated by uplink grants, when PDCCH transmission is for the UE with the data transmission and contains the uplink grants for a retransmission. The case for "restarting the timer later than" here means that restarting the timer at the first slot plus a configured/predefined duration/one slot, or at the first slot plus round-trip time (RTT) duration.

In an example, bundling resources are configured. After the data transmission using the pre-configured uplink resources which is configured with bundling, the MAC entity will monitor PDCCH with the control of a timer, which starts at or later than the slot that contains the first of the corresponding PUSCH transmission (that is, the data transmission). While the timer is running, if the PDCCH transmission is for the UE with small data transmission and contains an UL grant(s) for a retransmission, the MAC entity shall restart the timer at or later than the first slot of a PUSCH transmission corresponding to the retransmission indicated by the UL grant(s).

In another example, multiple consecutive slots (or TTIs) are granted in NR or NR-U. After transmission using the pre-configured uplink resources which is configured with multiple slots (or TTIs), the MAC entity shall monitor PDCCH with the control of a timer, which starts at or later than the slot that contains the first (or last) of the corresponding PUSCH transmission. While the timer is running, if the PDCCH transmission is for the UE with small data transmission and contains an UL grant(s) for a retransmission, the MAC entity shall restart the timer at or later than the first(last) slot of a PUSCH transmission corresponding to the retransmission indicated by the UL grant(s). The PUSCH transmission is the small data transmission.

For the above timer, the UE may extend a monitor window of the timer when the monitor window cannot receive the whole PDCCH, and receive the missed part of the PDCCH in the extended monitor window.

For example, in the case that one timer is configured to monitor the PDCCH for multiple grants transmission, the monitor window or the monitor timer length can be extended (to a configured length) if the first monitor window cannot receive all the PDCCH response because the network acquires channel late. Once the PDCCH is transmitted, it can keep the sequence corresponding to the uplink transmission or the missed part of response is transmitted in the extended window.

In another embodiment of the present application, multiple non-consecutive slots (or TTIs) are granted in NR or NR-U, and in order to monitor the feedback for the data transmission (for example, PDCCH), multiple timers are configured. In particular, multiple timers are configured for the pre-configured bundling resource(s) for the pre-configured at least one slot for at least one TB, the pre-configured at least one slot is non-consecutive, and the pre-configured bundling resource(s) are non-consecutive. In an example, each timer is corresponding to a part of the non-consecutive granted resource within one cycle. A part of the non-consecutive granted resource can correspond to a TB transmission resource or a TB transmission occasion. In another example, each timer may correspond to each TB of the at least one TB within one cycle. The timer may be configured by the network for the UE.

The UE may start each timer of the multiple timers starts at or after the slot that contains the PUSCH transmission (that is, the small data transmission).

Furthermore, the timer can be restarted once (or after) receiving a PDCCH within the set of response if some of the PDCCH messages failed to be transmitted because of the expiry of the monitor window led by LBT failure(s) while some of the later PDCCH messages are transmit after acquiring channel(s). The network can transmit the missed PDCCH due to LBT failures following the PDCCH which acquires channel(s) before the monitor timer expires.

RACH Based Solution

Regarding the issue on whether to allow small data transmission to choose a legacy PUSCH of Msg.A of 2-step RACH procedure in 2-step RACH procedure in NR and NR-U, the inventor of the present application considers that: small data transmission can be performed by 2-step RACH.

The PUSCH configuration of Msg.A of 2-step RACH procedure in 2-step RACH procedure could be common configuration or dedicated configuration for the UE. Considering the diversity of the traffic which can be transmitted as small data transmission, the PUSCH configuration of Msg. A can be various; especially the configuration for small data transmission can be different from the legacy RACH. The legacy RACH indicates the RACH procedure in which the PUSCH is not configured for the data transmission. The legacy PUSCH indicates the PUSCH which is not configured for the data transmission in the legacy RACH procedure. In general, it can be assumed that the resource for the legacy PUSCH of Msg.A of 2-step RACH procedure in 2-step RACH procedure is less than the resource for the PUSCH of Msg.A of 2-step RACH procedure for the small data transmission (also called small data PUSCH of Msg.A of 2-step RACH procedure hereinafter) in 2-step RACH procedure. To guarantee the uplink coverage, it is better to assemble less data in the uplink package when the UE is at the edge of the cell.

In an embodiment of the present application, the UE may perform the data transmission by using the legacy PUSCH of Msg.A of 2-step RACH procedure, when RSRP of the UE is small than a first threshold, e.g., threshold 1. For the network, the BS may transmit an indication for indicating the UE to perform the data transmission by using the legacy PUSCH of Msg.A of 2-step RACH procedure, when RSRP of the UE is small than a first threshold.

For example, when one legacy PUSCH of Msg.A of 2-step RACH procedure and one small data PUSCH of Msg.A of 2-step RACH procedure are configured, the UE is allowed to choose a legacy PUSCH of Msg.A of 2-step RACH procedure to perform small data transmission if the UE is located at the cell edge, e.g. the RSRP<threshold 1.

In another example, at least one of the following conditions needs to be further considered: data in the buffer of the UE is smaller than a second threshold, e.g., threshold2; modulation and coding scheme (MCS) is smaller than a third threshold, e.g., threshold3; and MCS is greater than a fourth threshold, e.g., threshold4. That is, in some cases, even though the UE is located at the cell edge (e.g. the RSRP<threshold 1), if the data in the buffer of the UE>threshold2, the UE is not allowed to choose a legacy PUSCH of Msg.A of 2-step RACH procedure to perform small data transmission.

In another embodiment of the present application, when one legacy PUSCH of Msg.A of 2-step RACH procedure and multiple small data PUSCH of Msg.A of 2-step RACH procedure are configured, the UE is not allowed to choose a legacy PUSCH of Msg.A of 2-step RACH procedure to perform small data transmission. In this case, multiple separate PUSCHs of Msg.A of 2-step RACH procedure for small data transmission are broadcast or RRC dedicated configuration. In an example, the multiple separate PUSCHs of Msg.A of 2-step RACH procedure for small data transmission are for different traffics.

In yet another embodiment of the present application, the UE may perform the data transmission by using PUSCH of Msg.A of 2-step RACH procedure which is configured for another traffic of data transmission, if RSRP of the UE is larger than a first threshold. For the network, the BS may transmit an indication for indicating the UE to perform the data transmission by using PUSCH of Msg.A of 2-step RACH procedure which is configured for another traffic of data transmission when RSRP of the UE is larger than a first threshold.

For example, when one legacy PUSCH of Msg.A of 2-step RACH procedure and multiple small data PUSCH of Msg.A of 2-step RACH procedure are configured, the UE is not allowed to choose a legacy PUSCH of Msg.A of 2-step RACH procedure to perform small data transmission, but is allowed to choose another PUSCH of Msg.A of 2-step RACH procedure which is configured for another traffic of small data transmission or is configured with a less resource (cannot assemble all the buffered data) if the UE is located at the cell center, e.g. the RSRP>threshold1.

In another example, at least one of the following conditions needs to be further considered: data in the buffer of the UE<threshold2; MCS<threshold3; and MCS>threshold4. That is, in some cases, even though the UE is located at the cell center, e.g. the RSRP>threshold1, if the data in the buffer of the UE>threshold2, the UE is not allowed to choose another PUSCH of Msg.A of 2-step RACH procedure which is configured for another traffic of small data transmission or is configured with a less resource. In this case, one or multiple separate PUSCH of Msg.A of 2-step RACH procedure for small data transmission are broadcast or RRC dedicated configuration. In an example, the multiple separate PUSCHs of Msg.A of 2-step RACH procedure for small data transmission are for different traffics.

In yet another embodiment of the present application, when one legacy PUSCH of Msg.A of 2-step RACH procedure and multiple small data PUSCH of Msg.A of 2-step RACH procedure are configured, the UE may perform the data transmission by using the legacy PUSCH of Msg.A of 2-step RACH procedure, when the UE is located at the cell edge, e.g., RSRP of the UE is small than a first threshold (threshold 1). For the network, the BS may transmit an indication for indicating the UE to perform the data transmission by using the legacy PUSCH of Msg.A of 2-step RACH procedure, when the UE is located at the cell edge, e.g., RSRP of the UE is small than a first threshold (threshold1).

In another example, at least one of the following conditions needs to be further considered: data in the buffer of the UE<threshold2; and MCS of legacy PUSCH of Msg.A of 2-step RACH procedure<all of the MCS of small data PUSCH of Msg.A of 2-step RACH procedure. That is, in some cases, even though the UE is located at the cell edge, e.g., RSRP of the UE is small than a first threshold (threshold1), if the data in the buffer of the UE>threshold2, the UE is not allowed to choose a legacy PUSCH of Msg.A of 2-step RACH procedure to perform small data transmission. In this case, one or multiple separate PUSCH of Msg.A of 2-step RACH procedure for small data transmission are broadcast or RRC dedicated configuration. In an example, the multiple separate PUSCHs of Msg.A of 2-step RACH procedure for small data transmission are for different traffic.

Although the pre-configured resources solution and the RACH based solution are described with respect to the issues, it should be understood that the two solutions may be performed according to actual needs or requirements, which are not limited to the above described issues.

In an embodiment of the present application, if both the pre-configured resources solution and the RACH based solution are enabled by the UE and network, and the pre-configured resources are not suitable for the small data transmission, the UE is allowed to perform the small data transmission on the resource which is configured for RACH based solution.

In another embodiment of the present application, if 2-step RACH based solution and 4-step RACH based solution are enabled by the UE and network, the UE is allowed to perform the small data transmission by 2-step RACH procedure prior to 4-step RACH procedure. In an example, the UE performs the small data transmission by 2-step RACH procedure prior to 4-step RACH procedure when there is 2-step RACH configuration and the configuration is suitable for the data transmission. In another example, the UE performs the small data transmission by 2-step RACH procedure prior to 4-step RACH procedure when the 2-step RACH procedure is allowed to perform the data transmission and the UE has the capability of data transmission by 2-step RACH procedure.

According to the embodiments of the present application, in order to realize the feature of small data transmission in NR, the rule for implicitly releasing the pre-configured resources in NR and NR-U is proposed and the counter for implicitly releasing resources can be configured per pre-configured uplink resource or per TB transmission occasion. In addition, the rule for monitoring the PDCCH after transmission on the pre-configured resources in NR and NR-U is proposed and one or multiple timers can be configured. When multiple timers are configured, each timer corresponds to a part of the non-consecutive granted resource within one cycle. Furthermore, to satisfy the diversity of the traffic which can be transmitted as small data transmission, the UE is allowed to choose a legacy PUSCH of Msg.A to perform small data transmission if the UE is located at the cell edge.

Although the above embodiments are described in the cases of NR and NR-U, it should be understood that as the technology develops and advances, the above embodiments may be applied to technology in the future.

Figure 3:
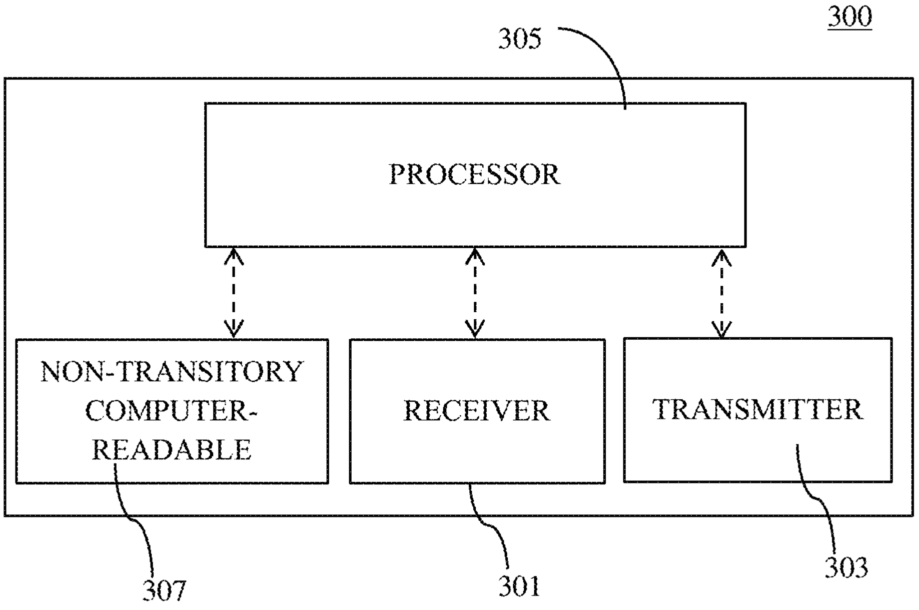
FIG. 3 illustrates an apparatus according to some embodiments of the present application.

FIG. 3 illustrates an apparatus according to some embodiments of the present application. In some embodiments of the present application, the apparatus 300 may be the UE 101 as illustrated in FIG. 1 or other embodiments of the present application.

As shown in FIG. 3, the apparatus 300 may include a receiver 301, a transmitter 303, a processer 305, and a non-transitory computer-readable medium 307. The non-transitory computer-readable medium 307 has computer executable instructions stored therein. The processer 305 is configured to be coupled to the non-transitory computer readable medium 307, the receiver 301, and the transmitter 303. It is contemplated that the apparatus 300 may include more computer-readable mediums, receiver, transmitter and processors in some other embodiments of the present application according to practical requirements. In some embodiments of the present application, the receiver 301 and the transmitter 303 are integrated into a single device, such as a transceiver. In certain embodiments, the apparatus 300 may further include an input device, a memory, and/or other components.

In some embodiments of the present application, the non-transitory computer-readable medium 307 may have stored thereon computer-executable instructions to cause a processor to implement the method according to embodiments of the present application.

Figure 4:
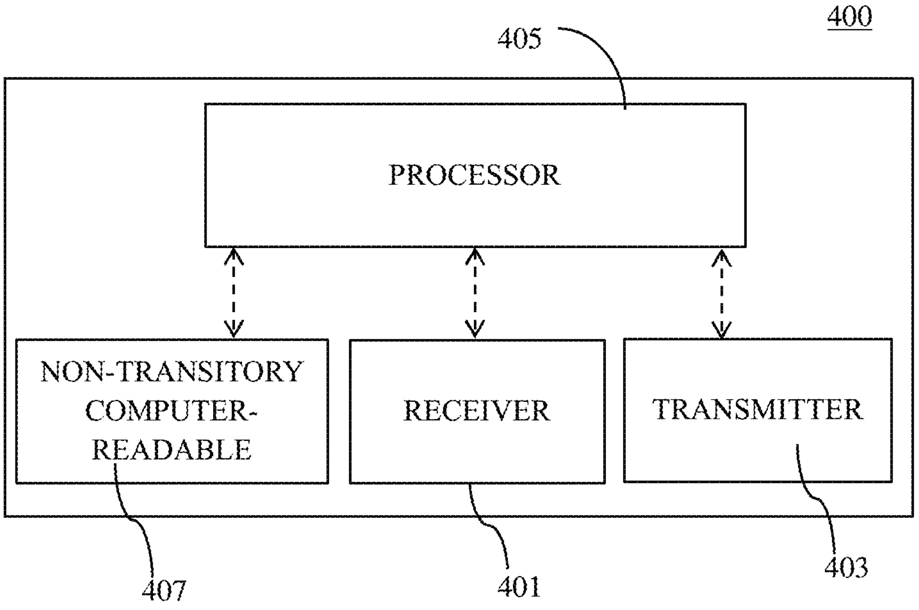
FIG. 4 illustrates another apparatus according to some other embodiments of the present application.

FIG. 4 illustrates another apparatus according to some embodiments of the present application. In some embodiments of the present application, the apparatus 400 may be the BS 102 as illustrated in FIG. 1 or other embodiments of the present application.

As shown in FIG. 4, the apparatus 400 may include a receiver 401, a transmitter 403, a processer 405, and a non-transitory computer-readable medium 407. The non-transitory computer-readable medium 407 has computer executable instructions stored therein. The processer 405 is configured to be coupled to the non-transitory computer readable medium 407, the receiver 401, and the transmitter 403. It is contemplated that the apparatus 400 may include more computer-readable mediums, receiver, transmitter and processors in some other embodiments of the present application according to practical requirements. In some embodiments of the present application, the receiver 401 and the transmitter 403 are integrated into a single device, such as a transceiver. In certain embodiments, the apparatus 400 may further include an input device, a memory, and/or other components.

In some embodiments of the present application, the non-transitory computer-readable medium 407 may have stored thereon computer-executable instructions to cause a processor to implement the method according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method, comprising:

receiving configuration information for data transmission, wherein the configuration information for data transmission indicates at least one of the following:

first configuration information indicating pre-configured bundling resource(s) for one transport block (TB) or pre-configured at least one slot for at least one TB; and second configuration information indicating at least one resource for data transmission during at least one random access channel (RACH) procedure; and performing the data transmission based on the configuration information when a user equipment (UE) is in radio resource control (RRC)_IDLE state or RRC_INACTIVE state, wherein performing the data transmission based on the first configuration information further comprises:

configuring one timer for the pre-configured bundling resource(s) for one TB or the pre-configured at least one slot for at least one TB; and starting the timer at a slot that contains the first of a corresponding PUSCH transmission for the data transmission, wherein the timer is used to monitor feedback for the data transmission.

2. The method of claim 1, wherein performing the data transmission based on the first configuration information further comprises:

configuring one counter "m" for the pre-configured bundling resource(s) for one TB or the pre-configured at least one slot for at least one TB; and keeping a value of the counter "m" unchanged when only part of one configured resource occasion for the pre-configured bundling resource(s) is used for data transmission, wherein the counter "m" is used to implicitly release the pre-configured bundling resource(s).

3. The method of claim 1, wherein performing the data transmission based on the first configuration information further comprises:

configuring a plurality of counters "m" with each counter "m" for the pre-configured bundling resource(s) for each TB of the at least one TB, wherein the counter "m" is used to implicitly release the pre-configured bundling resource(s); and increasing a value of the counter "m" in response to one or both of:

the pre-configured bundling resource(s) for each TB is not used while the UE is in RRC_INACTIVE state or RRC_IDLE state; and the pre-configured bundling resource(s) for each TB is used in RRC_INACTIVE or RRC_IDLE but no response is received.

4. The method of claim 1, wherein performing the data transmission based on the first configuration information further comprises:

configuring one counter "m" for the pre-configured bundling resource(s) for one TB or the pre-configured at least one slot for at least one TB; and increasing a value of the counter "m" when only part of one configured resource occasion for the pre-configured bundling resource(s) is used for data transmission, wherein the counter "m" is used to implicitly release the pre-configured bundling resource(s).

5. The method of claim 1, further comprising:

restarting the timer at or later than a first slot or a last slot of a PUSCH transmission corresponding to a retransmission indicated by uplink grants, when PDCCH transmission is for the UE with the data transmission and contains the uplink grants for a retransmission.

6. An apparatus, comprising:

at least one non-transitory computer-readable medium having computer executable instructions stored therein;

at least one receiver;

at least one transmitter; and at least one processor coupled to the at least one non-transitory computer-readable medium, the at least one receiver and the at least one transmitter;

wherein the computer executable instructions cause the at least one processor to:

receive configuration information for data transmission, wherein the configuration information for data transmission indicates at least one of the following:

first configuration information indicating pre-configured bundling resource(s) for one transport block (TB) or pre-configured at least one slot for at least one TB; and second configuration information indicating at least one resource for data transmission during at least one random access channel (RACH) procedure; and perform the data transmission based on the configuration information when a user equipment (UE) is in radio resource control (RRC)_IDLE state or RRC_INACTIVE state, wherein to perform the data transmission based on the first configuration information, the at least one processor:

configures one timer for the pre-configured bundling resource(s) for one TB or the pre-configured at least one slot for at least one TB; and starts the timer at a slot that contains the first of a corresponding PUSCH transmission for the data transmission, wherein the timer is used to monitor feedback for the data transmission.

7. The apparatus of claim 6, wherein to perform the data transmission based on the first configuration information, the at least one processor:

configures a plurality of counters "m" with each counter "m" for the pre-configured bundling resource(s) for each TB of the at least one TB, wherein the counter "m" is used to implicitly release the pre-configured bundling resource(s); and increase a value of the counter "m" in response to one or both of:

the pre-configured bundling resource(s) for each TB is not used while the UE is in RRC_INACTIVE state or RRC_IDLE state; and the pre-configured bundling resource(s) for each TB is used in RRC_INACTIVE or RRC_IDLE but no response is received.

8. The apparatus of claim 6, wherein to perform the data transmission based on the first configuration information, the at least one processor:

configures one counter "m" for the pre-configured bundling resource(s) for one TB or the pre-configured at least one slot for at least one TB; and increases a value of the counter "m" in response to only part of one configured resource occasion for the pre-configured bundling resource(s) being used for data transmission, wherein the counter "m" is used to implicitly release the pre-configured bundling resource(s).

9. The apparatus of claim 6, wherein the at least one processor:

restarts the timer at or later than a first slot or a last slot of a PUSCH transmission corresponding to a retransmission indicated by uplink grants, in response to a PDCCH transmission being for the UE with the data transmission and containing the uplink grants for a retransmission.

10. The apparatus of claim 9, wherein the computer executable instructions cause the at least one processor to:

extend a monitor window of the timer when the monitor window cannot receive all PDCCH; and receive a missed part of the PDCCH in the extended monitor window.

11. The apparatus of claim 6, wherein:

the pre-configured at least one slot are multiple non-consecutive slots, and the pre-configured bundling resource(s) are multiple non-consecutive resources; and to perform the data transmission based on the first configuration information, the at least one processor:

configures a plurality of timers for the pre-configured bundling resource(s) for the pre-configured at least one slot for at least one TB; and starts each timer of the plurality of timers at or after a slot that contains a PUSCH transmission of the data transmission, wherein each timer is used to monitor feedback for the data transmission, and each timer corresponds to one of (i) a part of the non-consecutive resources within one cycle or (ii) each TB of the at least one TB within one cycle.

12. The apparatus of claim 6, wherein to perform the data transmission based on the second configuration information, the at least one processor at least one of:

performs the data transmission by using PUSCH of Msg.A of 2-step RACH procedure which is not configured for the data transmission, when reference signal receiving power (RSRP) of the UE is smaller than a first threshold; and performs the data transmission by using PUSCH of Msg.A of 2-step RACH procedure which is configured for another traffic of data transmission, if reference signal receiving power (RSRP) of the UE is larger than a first threshold.

13. An apparatus, comprising:

at least one non-transitory computer-readable medium having computer executable instructions stored therein;

at least one receiver;

at least one transmitter; and at least one processor coupled to the at least one non-transitory computer-readable medium, the at least one receiver and the at least one transmitter;

wherein the computer executable instructions cause the at least one processor to:

transmit configuration information for data transmission, wherein the configuration information for data transmission indicates at least one of the following:

first configuration information indicating pre-configured bundling resource(s) for one transport block (TB) or pre-configured at least one slot for at least one TB, wherein the computer executable instructions cause the at least one processor to configure a timer for the pre-configured bundling resource(s) for one TB or the pre-configured at least one slot for at least one TB, the timer configured to start at a slot that contains the first of a corresponding PUSCH transmission for the data transmission, wherein the timer is used by a receiving UE to monitor feedback for the data transmission; and second configuration information indicating at least one resource for data transmission during at least one random access channel (RACH) procedure; and receive the data transmission based on the configuration information when a user equipment (UE) is in radio resource control (RRC)_IDLE state or RRC_INACTIVE state.

14. The apparatus of claim 13, wherein when receiving the data transmission based on the first configuration information, the computer executable instructions cause the at least one processor to:

configure one counter "m" for the pre-configured bundling resource(s) for one TB or the pre-configured at least one slot for at least one TB; and keep a value of the counter "m" unchanged when data is received on only part of one configured resource occasion for the pre-configured bundling resource(s), wherein the counter "m" is used to implicitly release the pre-configured bundling resource(s).

15. The apparatus of claim 13, wherein when receiving the data transmission based on the first configuration information, the computer executable instructions cause the at least one processor to:

configure a plurality of counters "m" with each counter "m" for the pre-configured bundling resource(s) for each TB of the at least one TB, wherein the counter "m" is used to implicitly release the pre-configured bundling resource(s); and increase a value of the counter "m" when a response corresponding to the pre-configured bundling resource (s) for each TB including a case of LBT failure is transmitted while the UE is in RRC_INACTIVE state or RRC_IDLE state.

16. The apparatus of claim 13, wherein when receiving the data transmission based on the first configuration information, the computer executable instructions cause the at least one processor to:

configure one counter "m" for the pre-configured bundling resource(s) for one TB or the pre-configured at least one slot for at least one TB; and increasing a value of the counter "m" when data is received on only part of one configured resource occasion for the pre-configured bundling resource (s), wherein the counter "m" is used to implicitly release the pre-configured bundling resource(s).

17. The apparatus of claim 13, wherein:

the data transmission is received based on the first configuration information, the pre-configured at least one slot are multiple non-consecutive slots, and the pre-configured bundling resource(s) are multiple non-consecutive resources; and the computer executable instructions cause the at least one processor to:

configure a plurality of timers for the pre-configured bundling resource(s) or for the pre-configured at least one slot for at least one TB, wherein each timer is used for the UE to monitor feedback for the data transmission.

18. The apparatus of claim 13, wherein, the data transmission is received based on the first configuration information, and the computer executable instructions cause the at least one processor to at least one of:

transmit an indication for indicating the UE to perform the data transmission by using PUSCH of Msg.A of 2-step RACH procedure which is not configured for the data transmission, when reference signal receiving power (RSRP) of the UE is smaller than a first threshold; and transmit an indication for indicating the UE to perform the data transmission by using PUSCH of Msg.A of 2-step RACH procedure which is configured for another traffic of data transmission, when reference signal receiving power (RSRP) of the UE is larger than a first threshold.

* * * * *